United States Patent
Qian et al.

(10) Patent No.: US 9,602,528 B2
(45) Date of Patent: Mar. 21, 2017

(54) DISCOVERING AND CONSTRAINING IDLE PROCESSES

(71) Applicant: NEC Laboratories America, Inc., Princeton, NJ (US)

(72) Inventors: Zhiyun Qian, Riverside, CA (US); Jun Wang, Santa Clara, CA (US); Zhichun Li, Princeton, NJ (US); Zhenyu Wu, Plainsboro, NJ (US); Junghwan Rhee, Princeton, NJ (US); Xia Ning, Carmel, IN (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 3 days.

(21) Appl. No.: 14/712,421

(22) Filed: May 14, 2015

(65) Prior Publication Data
US 2015/0334128 A1    Nov. 19, 2015

Related U.S. Application Data

(60) Provisional application No. 61/993,762, filed on May 15, 2014.

(51) Int. Cl.
| | |
|---|---|
| G06F 21/00 | (2013.01) |
| H04L 29/06 | (2006.01) |
| G06N 99/00 | (2010.01) |
| G06F 11/30 | (2006.01) |
| G06F 21/50 | (2013.01) |
| G06F 21/55 | (2013.01) |

(52) U.S. Cl.
CPC .......... *H04L 63/1425* (2013.01); *G06F 11/30* (2013.01); *G06F 21/50* (2013.01); *G06F 21/552* (2013.01); *G06F 21/554* (2013.01); *G06N 99/005* (2013.01); *H04L 63/1441* (2013.01)

(58) Field of Classification Search
CPC . H04L 63/1416; H04L 63/1425; G06F 21/56; G06F 21/577
USPC ..................................... 726/22–25
See application file for complete search history.

(56) References Cited

U.S. PATENT DOCUMENTS

| | | | | |
|---|---|---|---|---|
| 5,416,726 A | * | 5/1995 | Garcia-Duarte | G06F 1/3203 712/E9.032 |
| 2010/0229237 A1 | * | 9/2010 | Rusche | H04L 51/12 726/22 |
| 2013/0312093 A1 | * | 11/2013 | Hirvonen | G06F 21/554 726/22 |

OTHER PUBLICATIONS

Guha, S. et al., "How Healthy are Today's Enterprise Networks?" IMC'08, Oct. 2008, pp. 145-150.
Kurmus, A. et al., "Attack Surface Metrics and Automated Compile-Time OS Kernel Tailoring," Feb. 2013, pp. 1-17.
Sekar, R. et al., "A Fast Automaton-Based Method for Detecting Anomalous Program Behaviors," IEEE, May 2001, pp. 144-155.

* cited by examiner

*Primary Examiner* — Alexander Lagor
(74) *Attorney, Agent, or Firm* — Joseph Kolodka

(57) ABSTRACT

Methods and systems for process constraint include collecting system call information for a process. It is detected whether the process is idle based on the system call information and then whether the process is repeating using autocorrelation to determine whether the process issues system calls in a periodic fashion. The process is constrained if it is idle or repeating to limit an attack surface presented by the process.

4 Claims, 3 Drawing Sheets

DISCOVERING AND CONSTRAINING IDLE PROCESSES

RELATED APPLICATION INFORMATION

This application claims priority to provisional application 61/993,762, filed May 15, 2014, the contents thereof being incorporated herein by reference.

BACKGROUND OF THE INVENTION

Enterprise systems grow increasingly complex and have become very difficult to secure. It is becoming impossible to remove—or even know about—every security hole. However, it is important to close as many such holes as possible to prevent potential attacks.

There are generally two extreme approaches to the elimination or reduction of an attack surface. A first approach uses strict security rules to eliminate certain attack surfaces. The advantage of this approach is that it is easy to deploy and enforce. A downside, however, is that the rules may be too strict, such that the user of the system may be inconvenienced. For example, some rules may completely lock down a host to prevent users from installing software, when there are legitimate cases where a user may need to do so.

A second approach applies machine learning to find the normal behavior of programs and then detects deviations from the baseline. This approach has the advantage of being general—it can be used to protect programs from unknown attacks. A downside is that it typically results in many false alarms that may cause the system to be unusable.

BRIEF SUMMARY OF THE INVENTION

A method for process constraint includes collecting system call information for a process. It is detected whether the process is idle based on the system call information and then whether the process is repeating using autocorrelation to determine whether the process issues system calls in a periodic fashion. The process is constrained if it is idle or repeating to limit an attack surface presented by the process.

A system for process constraint includes a system call monitor configured to store system call information for a process in a memory and to determine whether the process is idle. A processor is configured to detect whether the process is idle based on the system call information and to detect whether the process is repeating using autocorrelation to determine whether the process issues system calls in a periodic fashion. A constraint module is configured to constrain the process if it is idle or repeating to limit an attack surface presented by the process.

DETAILED DESCRIPTION

Embodiments of the present principles use system call events to identify long-running processes that are either completely idle or repeatedly checking certain input without producing useful output. These processes are constrainable and potentially can be eliminated altogether. Generally speaking, any long-running process should typically be running in a loop and in one of three states at any given moment. In a first state, the process is completely idle and blocked on an input channel. In a second state, the process repeatedly checks for input but the real input never arrived or produced no output or repeated output. In a third state, useful input has been received and useful outputs are produced. The present embodiments identify the first two states and constrains them or eliminates them, thereby reducing attack surface. The first two states are defined herein as idling processes.

The present embodiments use minimal monitoring of system call events to yield a small monitoring overhead. They can also provide hints as to whether a process is potentially unnecessary and can therefore be shut down directly.

Figure 1:
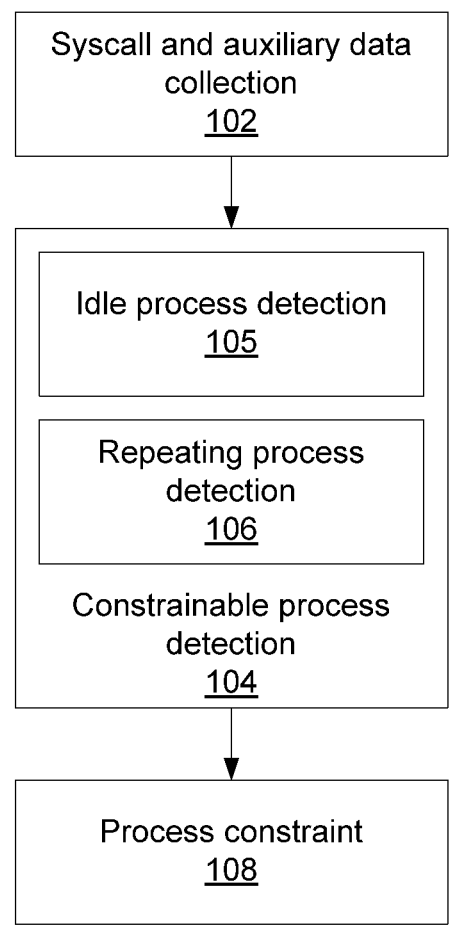
FIG. 1 is a block/flow diagram showing a method/system for process constraint in accordance with the present principles.

Referring now to FIG. 1, a block/flow diagram of a method/system for constraining system architecture is shown. Block 102 tracks syscalls and performs other data for processes running on a system. Block 104 uses this information to detect constrainable processes. In general, if a process exhibits only limited behaviors over time then it is likely that the process is constrainable as its full functionalities are not exercised. While a state machine of a program can be built through runtime monitoring, such models necessitate recording significant information about every syscall, including its call stack and parameters. The overhead of such an approach can be extremely high—100% to 250% in some cases.

To make the present embodiments practical and deployable in production environments, which typically can tolerate only a low monitoring overhead, block 104 selects a subset of system calls to monitor and declines to monitor the call stacks, which can be very resource intensive. Detecting constrainable processes includes detecting idle processes in block 105 and detecting repeating processes in block 106. Idle processes are those which are blocked on certain external events or external inputs, while repeating processes are those which loop and wait for certain conditions to be met (e.g., waiting for a file to be created). Once constrainable processes have been identified, block 108 constrains the processes, reducing the exposed attack surface.

Figure 2:
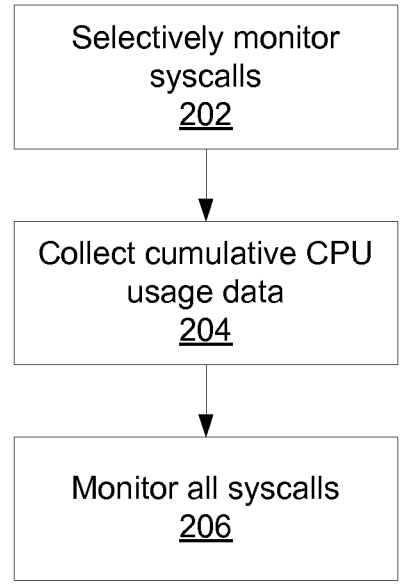
FIG. 2 is a block/flow diagram showing a method/system for detecting idle processes in accordance with the present principles.

Referring now to FIG. 2, a block/flow diagram of a method/system for detecting idle processes is shown. Block 202 performs lightweight, selective monitoring of syscalls. Since lightweight monitoring monitors only a subset of system calls, certain system calls, such as read and write, may never be captured. Block 204 considers CPU utilization by a process as an alternative approach to finding if a process has issued any system calls. The granularity of CPU utilization is coarse-grained, however, and in some cases will show a utilization of zero when the process still actively issues some system calls (though the number of system calls in such a case is likely to be small). As a safeguard, block 206 performs full system call monitoring in case block 202 shows zero syscall events and block 204 shows zero CPU usage.

Figure 3:
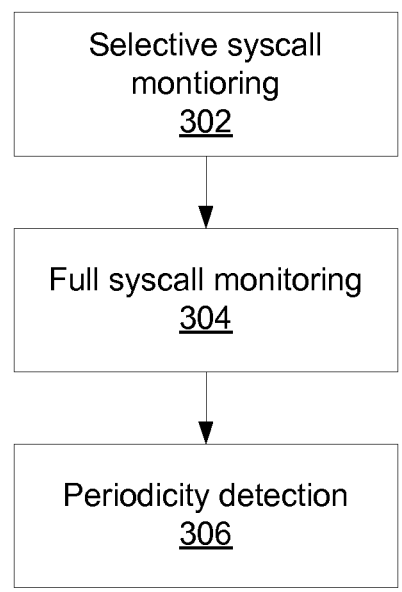
FIG. 3 is a block/flow diagram showing a method/system for detecting repeating processes in accordance with the present principles.

Referring now to FIG. 3, a block/flow diagram of a method/system for detecting repeating processes is shown. Block 302 uses lightweight, selective syscall monitoring, using full syscall monitoring 304 as a fallback. Full syscall monitoring may be needed because that it is possible for system call events to be determined as being periodic based on only the selective syscall set and yet be clearly non-periodic when considering the full syscall set. For example, some processes in a loop issuing various system calls may look exactly periodic, except that in some instances of the loop the system call nano_sleep( ) may be called twice instead of once. These omitted system calls rarely matter, so the processes determined to be periodic may still be constrainable, even if they are not strictly periodic in fact.

Detecting periodicity in block 306 can be relatively involved. At a high level, the event log (with timestamp) is transformed into a format that can be consumed by an autocorrelation tool. The idea of autocorrelation is to provide a measure of similarity between a signal and itself at a given lag. A normalized autocorrelation coefficient of "1" implies perfect similarity and "−1" implies perfect similarity with a 180 degree phase difference. For a signal that is periodic, its autocorrelation will have a series of peaks that equal to 1. These peaks indicate the lags where the shifted signal is perfectly similar to the original signal. To determine whether the original signal is periodic, one can measure the height of the peaks as well as the distance between each pair of consecutive peaks.

A difficulty in performing the autocorrelation lies in ensuring that the time information is not lost when transforming the syccall data into the autocorrelation format. To address this, a single system call event is converted into a number (e.g., 1 for open, 2 for close, etc.). The correlation should be strong only if two numbers match exactly. For example, there is no difference between a comparison between 1 and 2 and 1 and 100—in each case there is no correlation. If there are no system calls for a period of idle time, however, this information would have been lost. This issue can be solved by converting a period of idle time into a special signal, for example −1, to represent some idle time unit such as a millisecond, and −2 to represent double that amount.

However, timestamps collected can have some natural noise. For example, if two system calls occur back-to-back, their timestamps may be exactly the same if measured with millisecond precision. At other times, they may be one millisecond apart due to operating system scheduling dynamics. As a result, converted data may be quite noisy following this approach.

As a solution, events may be put into equally-sized time intervals, where every time interval has a vector of events. This does present a boundary issue, where a perfectly periodic sequence of system calls may be have slightly more events in one interval than in another. The reason for this is that the timestamps of some system calls may be very close to the boundary of the interval and, by chance, they may fall into either one of the two continuous intervals. Thus this approach may also result in noise.

However, by stripping the timestamp of each system call, the only remaining information between system calls is the order. Time factor is compensated for by having a time check as a post-filtering step. Every peak (referring to cases where shifted sequences match with the original sequence) is validated as to whether it is a true peak by shifting the original sequence by I data points. The average difference between the timestamps of each corresponding syscall pair is compared, where one of the pair is from the original sequence and the other is from the shifted sequence. If the peak is a true peak, then the average difference should be close to zero. Otherwise the average difference would be quite large. Block 306 compares the average difference to a threshold to determine whether the peak is a true peak.

Block 306 detects periodicity by applying autocorrelation on a collected system call event log over an extended period of time (e.g., one or two months). The output of the autocorrelation is used to accurately determine if the system call events are actually periodic and, if so, to determine what their period is.

Figure 4:
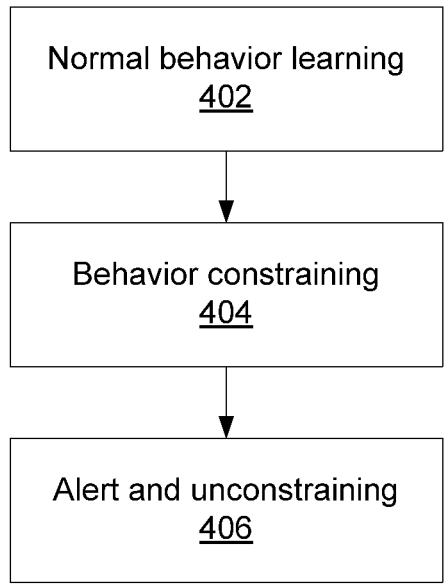
FIG. 4 is a block/flow diagram showing a method/system for constraining processes in accordance with the present principles.

Referring now to FIG. 4, a block/flow diagram of a method/system for constraining processes is shown. In block 402, the baseline/normal behavior of a process is learned over a time period T, which is based on the periodicity determined by block 306. This learning can be performed by any appropriate process, including for example one or more of program state machines, system call order, and system calls with a call stack. Block 404 constrains the process after training is complete. Block 404 may simply identify any system call that causes the program to deviate from normal behavior. Block 406 then raises an alarm when any such deviation occurs. This may indicate that the process has somehow been triggered to exercise functions that were not seen during training, or it may indicate that the process has been attacked and is performing unexpected operations as a result.

Block 404 may use a trace utility to constrain a processes behavior. This allows block 404 to observe the process in question, stop the execution of the process at any time to examine the execution state of the process, and to resume execution of the process. If behavior of the process deviates from the expected behavior, execution of the process is halted and action is taken at the user's or administrator's discretion. Such actions may include resuming execution, requesting further investigation, or terminating the process.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
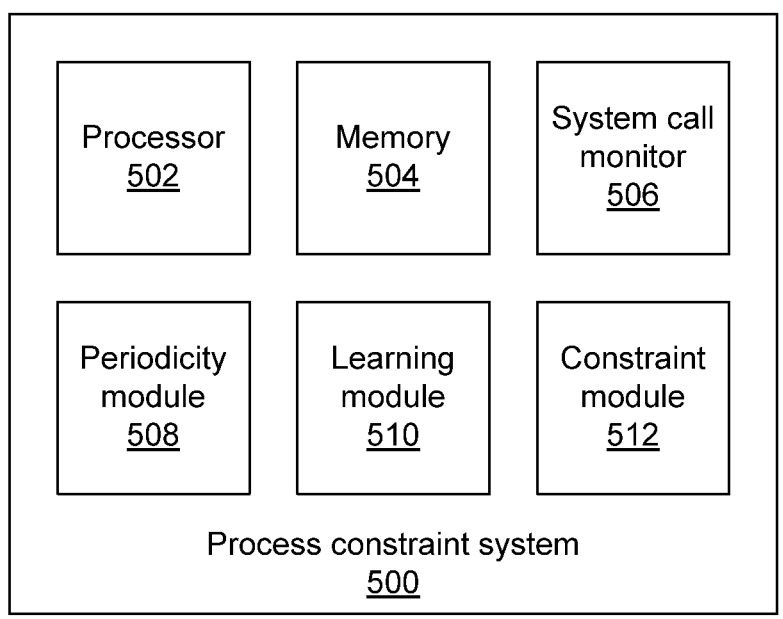
FIG. 5 is a block diagram of a system for process constraint in accordance with the present principles.

Referring now to FIG. 5, a block diagram of a system 500 for constraining system architecture is shown. The system 500 includes a processor 502 and memory 504. It should be emphasized that the present embodiments may be implemented as solely hardware using, e.g., application specific integrated chips or field programmable gate arrays for functional components, or may be implemented as software running on a general purpose hardware processor. The illustrated functional components may be implemented separately or may alternatively be combined into shared structures. A system call monitor 506 reviews system calls issued by a process in question and stores system call information in the memory 504. The monitor 506 may track all system calls or only a subset. This information may be used to determine if a process is idle.

A periodicity module 508 analyzes the recorded system calls using the processor 502 to determine whether a non-idle process is periodically repeating its behavior. A learning module 510 finds information regarding the normal behavior of the idling and repeating processes. A constraint module 512 then uses the information found by the learning module 510 to constrain the processes, for example by blocking system calls that are outside the normal behavior of the process and raising an alert.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for process constraint, comprising:
collecting system call information for a process;
detecting whether the process is idle based on the system call information;
detecting whether the process is repeating using autocorrelation to determine whether the process issues system calls in a periodic fashion; and
constraining the process if it is idle or repeating to limit an attack surface presented by the process;
wherein detecting whether the process is repeating comprises removing time stamp information from the system call information;
wherein detecting whether the process is repeating further comprises performing a time check by shifting an original sequence to match a correlated sequence and comparing an average difference between timestamps of corresponding pairs; and
wherein detecting whether the process is repeating comprises comparing the average difference to a threshold to determine whether the correlated sequence is true.

2. The method of claim 1, wherein collecting system call information comprises collecting a limited subset of system call information that does not include call stacks.

3. The method of claim 1, wherein detecting whether the process is idle further comprises monitoring processor activity.

4. The method of claim 1, wherein constraining the process comprises learning a normal behavior of the process and identifying system calls that fall outside the normal behavior.

* * * * *